United States Patent [19]

Schweitzer

[11] 4,405,729

[45] Sep. 20, 1983

[54] PIGMENT GRIND WITH FUMED SILICA

[75] Inventor: Francis E. Schweitzer, Philadelphia, Pa.

[73] Assignee: E. I. Du Pont de Nemours and Company, Wilmington, Del.

[21] Appl. No.: 389,286

[22] Filed: Jun. 17, 1982

[51] Int. Cl.³ .......................... C08K 3/36; C08L 67/02
[52] U.S. Cl. ..................................... 523/466; 524/539; 524/542; 524/604
[58] Field of Search ...................... 523/351, 466, 521; 524/539, 542, 604

[56] References Cited

U.S. PATENT DOCUMENTS 3,600,459  8/1971  Vasta ................................. 523/466
4,238,387 12/1980 Antonelli ........................... 524/601
4,332,701  6/1982  Ponyik ............................... 524/539

Primary Examiner—John C. Bleutge
Assistant Examiner—Patricia Short
Attorney, Agent, or Firm—William H. Thrower

[57] ABSTRACT

In the formulation of high solids pigmented film-forming coating compositions comprising low molecular weight polyester oligomers, co-dispersing fumed silica with the pigment mill base, then incorporating this co-dispersion into the composition yields enhanced color stability for the coating composition.

3 Claims, No Drawings

PIGMENT GRIND WITH FUMED SILICA

BACKGROUND OF THE INVENTION

1. Field of the Invention

This invention relates to the formulation of coating compositions with high polymer solids, more particularly to the formulation of a high solids pigmented film-forming coating composition comprising low molecular weight polyester oligomers by incorporating into the coating composition fumed silica co-dispersed with the pigment mill base.

2. Description of The Prior Art

Of particular interest to the present invention are high solids coating compositions based on low molecular weight polyester oligomers. Such compositions contain at least 50% by weight of film-forming constituents, the constituents typically comprising low molecular weight polyester oligomers with controlled hydroxyl functionality and a curing or crosslinking agent for the oligomers such as an aminoplast resin or organic polyisocyanate. These compositions can be applied to a substrate at relatively high solids levels and cured at commercially acceptable temperatures to provide a durable, flexible but hard, crosslinked polymeric finish while maintaining a desirable low level of solvent emissions during the coating process.

Blends of low molecular weight hydroxyterminated polyester based on diols such as 2,2,4-trimethyl-1,3-pentane diol and diacids or their esters, such as isophthalic acid, and incorporated into high solids coating compositions are disclosed in U.S. application Ser. No. 947,183, filed Sept. 29, 1978. Similar disclosure is found in U.K. Pat. No. 1,561,076, granted Apr. 16, 1980, incorporated herein by reference.

High solids coating compositions with film-forming constituents comprising a polyester polyol based on hindered glycols and optionally an epoxy resin or the esterification product of the epoxy resin with a monocarboxylic acid are disclosed in U.S. application Ser. No. 174,255, filed July 31, 1980. Similar disclosure is found in Belgium Pat. No. 887,266, granted July 28, 1981, incorporated herein by reference. Disclosed therein is a film-forming blend comprising a polyester polyol that is the reaction product of (1) neopentyl glycol and at least one other hindered diol containing two methylol groups wherein each methylol group is attached directly to a cycloaliphatic or aromatic structure or to a tertiary carbon atom, the molar ratio of neopentyl glycol to hindered diol being 2:1 to 6:1, and (2) a mixture of an aromatic and an aliphatic dicarboxylic acid wherein the molar ratio of aromatic acid to aliphatic acid is from 2:1 to 10:1, wherein the molar ratio of (1) to (2) is from 1.3:1 to 1.9:1 and wherein the polyol has a hydroxyl content of about 3.0-10.0% by weight;

The use of fumed silica as an additive for coating compositions is known in the art. Silica serves an important role for flow control to reduce sagging of a finished coating composition after application of the composition and during baking or curing of the coated film. U.S. Pat. No. 4,238,387, issued Dec. 9, 1980 to J. A. Antonelli et al. discloses an additive comprising fumed silica for high solids coating compositions to provide pseudoplastic rheology to the compositions.

An important optical property for a formulated coating composition is it's color stability. Colorimeters and spectrophotometers are well-known in the art and are used to measure certain optical properties of various paint films which have been coated over test panels. A typical spectrophotometer provides for the measurement of the amount of light reflected at varying light wavelength in the visible spectrum by a painted panel that is held at a given angle relative to the direction of an incident source of light. The reflectance factor of the coating composition enables paint chemists to calculate color values by which to characterize the color of the coating compositions.

For example, a coated panel is prepared using a particular coating composition and reflectance data is measured for that panel. The coating composition itself may then be aged for a given time and under given conditions of storage. A coated panel is then prepared utilizing the aged composition and reflectance data is measured and compared with that originally measured. Change in data reflects change in color, or "color drift" upon aging. The closer the compared values, the better the color stability for that coating composition.

In the formulation of pigmented high solids coating compositions based on low molecular weight polyester oligomers, certain problems in color stability become apparent. Stability tests on certain blends of colored mill bases with white enamels, i.e., lightly tinted compositions, drifted light upon aging of the composition. Enamel compositions tinted with inorganic pigments such as chrome yellow, molybdate orange, iron oxide red, ferrite yellow, and titanium yellow drifted toward deeper, more saturated colors, while enamels shaded with the organic pigments tended to have normal color stability.

These problems with color stability cannot be tolerated since it is clear that if there is color drift for a coating composition under various conditions of storage, it would be very difficult to match tints and to achieve constant color matches.

SUMMARY OF THE INVENTION

In the preparation of high solids coating compositions based on low molecular weight polyester oligomers, co-dispersing fumed silica with the pigment mill base, then blending this pigment mill base with the low molecular weight polyester oligomeric solution, yields a coating composition with unexpectedly improved properties of color stability.

DETAILED DESCRIPTION OF THE INVENTION

In the preparation of a pigmented, high solids coating composition based on low molecular weight polyester oligomers, co-dispersion of fumed silica with the pigment mill base, then incorporation of this co-dispersion into the coating composition has been found to give a surprising improvement in color stability to the composition.

The low molecular weight polyester oligomeric compositions subject to the present invention differ from conventional enamels in important aspects. Conventional enamels have a polymer solution as a vehicle. Upon application of a conventional enamel, i.e., by brushing or by spraying, loss of solvent from the wet film rapidly increases the viscosity of the vehicle. This increase in viscosity minimizes color drift in the wet film by controlling the surface tension, the film thickness, and the volatility of the solvents.

In a high solids polyester oligomeric composition there is little solvent and essentially no polymer in the vehicle. Upon application of the coating composition to a substrate, there is little change in viscosity of the vehicle due to solvent evaporation. Until curing is effected there remains low molecular weight polyester oligomers. To compensate for the lack of increase in vehicle viscosity, these compositions have been formulated with fumed silica, which gives high low shear viscosity and low high shear viscosity to the composition and prevents sagging, but does not change the viscosity of the vehicle. Thus color drift occurs due to pigment migration and flocculation in the wet film, resulting in poor color stability.

I have found that if both the prime pigment and the fumed silica are ground together, i.e., co-dispersed, in a vehicle system similar to that of the composition, then this co-dispersion incorporated into the coating composition, the color stability of the resulting composition is surprisingly enhanced.

The coating compositions subject to the present invention are high solids compositions containing at least 50% by weight of film forming constituents. The film forming constituents specifically comprise low molecular weight polyester oligomers together with a suitable curing or cross-linking agent. Appropriate polyester oligomers and curing agents include those polyesters disclosed in U.S. application Ser. Nos. 947,183 and 174,255, referenced above, or any blend thereof.

The pigments contemplated for use with the present invention include inorganic pigments such as titanium dioxide, chrome yellow, molybdate orange, iron oxide red, ferrite yellow, and titanium yellow.

Preferably, fumed silica is used that has a particle size of about 0.002 to 1.0 micrometers and a surface area of about 2.5 to 1200 square meters per gram. This silica is about 99.8% silica dioxide by weight (on a moisture free basis) and exists in three dimensional branched chain agregates and has a surface that is hydrophilic and capable of hydrogen bonding. One particularly preferred fumed silica is "Cab-O-Sil" M-5 (available from the Cabot Corporation) having a nominal particle size, assuming spherical particles, of about 0.007–0.014 micrometers and a surface area of about 200–400 square meters per gram.

A pigment mill base, or dispersion, is prepared by combining the pigment and fumed silica with a suitable dispersant medium and then dispersing in ways known in the art, for example in a high speed mixer. Sufficient fumed silica is included in the pigment mill base to yield enhanced color stability. Generally, a high solids polyester oligomeric coating composition incorporating fumed silica to control sagging will contain from 0.25 to 5.0% fumed silica by weight, based on the weight of the film forming constituents, more preferably 0.75 to 3%. All or a portion of the amount of the fumed silica to be incorporated into the coating composition may be co-dispersed with the pigment in the pigment mill base.

EXAMPLE

The improvement in color stability which results from this invention is best demonstrated by formulating high solids coating compositions comprising low molecular weight polyester oligomers, utilizing various pigments, and for each pigment formulate a composition wherein the pigment has been co-dispersed with the fumed silica and a composition wherein the pigment and the fumed silica are separately dispersed, and these separate dispersions are incorporated into the composition. Coated test panels can then be made from these compositions and these test panels subjected to colorimetric measurement. The formulated compositions are then aged under given conditions, in this example for one month at 120° F. (49° C.). Test panels are prepared from the aged compositions, subjected to colorimetric measurement, and color differences between the aged and unaged compositions calculated.

A polyester polyol solution, polyester A, was prepared from the following materials:

|  | Mole Ratio |
| --- | --- |
| Neopentyl glycol | 6.4 |
| Hydroxypivalic acid | 1.6 |
| Isophthalic acid | 2 |
| Phthalic anhydride | 2 |
| Adipic acid | 1 |

A polyester polyol solution, polyester B, was prepared from the following materials:

|  | Mole Ratio |
| --- | --- |
| 2,2,4-trimethyl-1,3-pentanediol | 2 |
| Isophthalic acid | 1 |

The following pigments were selected for comparative evaluation of color stability: carbon black; iron oxide; ferrite yellow; titanium yellow; monastral ® red.

For each of the pigments listed, a mill base was prepared containing no fumed silica and a mill base was prepared including fumed silica co-dispersed with the pigment. Additionally, white mill bases containing TiO$_2$ were prepared. These white mill bases are exemplary, with their components given here:

|  | Mill Base I | Mill Base II |
| --- | --- | --- |
| Polyester A | 22.44 wt. % | 20.29 wt. % |
| Amyl acetate | 6.64 | 5.51 |
| Acid capped hydroxyethyl Methacrylate methyl methacrylate | 2.08 | 1.73 |
| Butyl acetate | — | 1.98 |
| Hexamethoxy methyl melamine | — | 7.52 |
| Fumed silica ("Cab-O-Sil" M-5) | — | 0.42 |
| TiO$_2$ | 66.84 | 55.49 |

The colored pigmented mill bases prepared above were mixed with the white mill bases in a weight ratio mix of 9 parts white mill base to 1 part colored mill base. It is the lightly tinted, almost white shades such as these that the problem of color stability is most pronounced.

A silica dispersion was prepared by mixing the following ingredients and dispersing with a high speed mixer:

|  | Parts |
| --- | --- |
| Polyester A | 40.6 |
| Butyl Acetate | 11.38 |
| Hexamethoxy Melamine | 43.24 |
| "Cab-O-Sil" M-5 fumed silica | 4.78 |
|  | 100.00 |

Enamel compositions were prepared utilizing the prepared mill bases. Exemplary formulas are given here for enamel compositions incorporating Mill Base I and Mill Base II, prepared above.

|  | Enamel I | Enamel II |
|---|---|---|
| Mill Base I | 63.76 wt. % | — |
| Mill Base II | — | 76.03 wt. % |
| Silica dispersion | 13.36 | — |
| Polyester A | 4.73 | 7.70 |
| Polyester B | 3.36 | 2.08 |
| Hexamethoxymethylmelamine | 7.00 | 7.06 |
| Butyl Acetate | 0.66 | — |
| Dehydrated castor oil modified epoxy | 5.97 | 5.96 |
| Dinonyl naphthalene disulfonic acid neutralized with dimethylamine ethanol | 1.16 | 1.17 |
|  | 100.00 wt. % | 100.00 wt. % |

For each composition prepared above, a coated panel was prepared, the composition was aged for one month at 120° F. (49° C.), and a coated panel was prepared from the aged composition. Colorimetric measurements were made on the coated panels and the color differences calculated using the Adams-Nickerson equation. Color differences are provided in the following table:

| Pigment | Enamel Compositions, Pigment and Fumed Silica disperse separately | | | Enamel Compositions, Pigment and Fumed Silica co-dispersed | | |
|---|---|---|---|---|---|---|
|  | ΔL | Δa | Δb | ΔL | Δa | Δb |
| Carbon black | −.45 | −.14 | −.39 | −.16 | −.02 | −.02 |
| Iron oxide | −.80 | +1.07 | +1.09 | +.48 | −.16 | +.21 |
| Ferrite yellow | −.68 | +.57 | +2.85 | +.25 | +.03 | 0 |
| Titanium yellow | +1.19 | +.57 | +1.34 | +.41 | +.23 | +.21 |
| Monastral ® red | +.26 | +.54 | +.49 | −.77 | +1.33 | +.24 |

Comparing the above color differences, it can be seen that the color differences are much less for enamel compositions utilizing the co-dispersions of pigment with fumed silica.

What is claimed is:

1. In the process of formulating a pigmented coating composition, said composition comprising:
   (1) inorganic pigment,
   (2) a film-forming blend and a solvent for the blend,
   (3) an additive to provide pseudoplastic rheology to said composition, said additive comprising fumed silica,
   wherein said film-forming blend consists essentially of low molecular weight polyester oligomers, a curing agent for said oligomers, and optionally an epoxy resin or the ester of an epoxy resin and monocarboxylic acid, and said film-forming blend is present in an amount of at least 50% by weight of said composition,
   the improvement wherein a co-dispersion of said inorganic pigment and at least a portion of said fumed silica is prepared and incorporated into said composition, said fumed silica being present in said co-dispersion in an amount sufficient to yield enhanced color stability to said composition.

2. The process of claim 1 wherein said fumed silica is present in said co-dispersion in an amount of from 0.25 to 5.0% by weight, based on the weight of said film-forming blend.

3. The process of claim 2 wherein said fumed silica is present in said co-dispersion in an amount of from 0.75 to 3.0% by weight, based on the weight of said film-forming blend.

* * * * *